April 22, 1941.  D. SOLODAR  2,239,579
BOWING-INSTRUCTION AND PRACTICE DEVICE
Filed July 5, 1940  4 Sheets-Sheet 1

Inventor:-
David Solodar
by his Attorneys
Howson & Howson

April 22, 1941.  D. SOLODAR  2,239,579
BOWING-INSTRUCTION AND PRACTICE DEVICE
Filed July 5, 1940  4 Sheets-Sheet 2
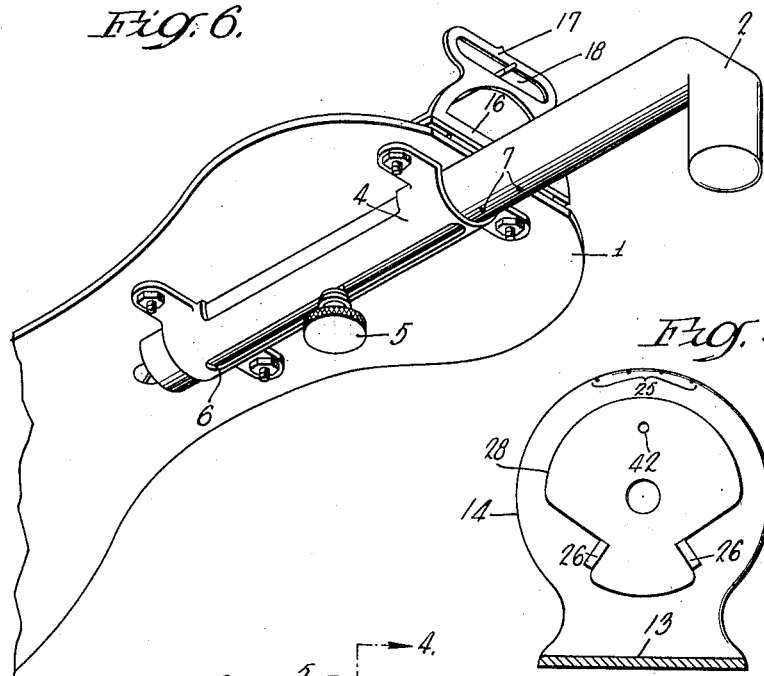
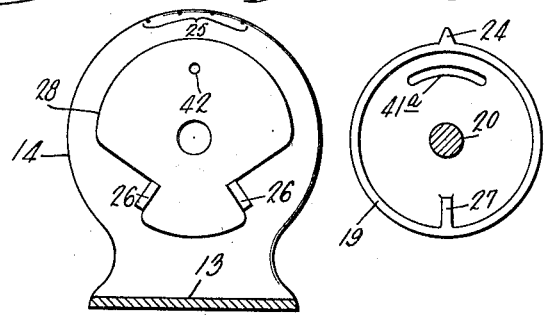
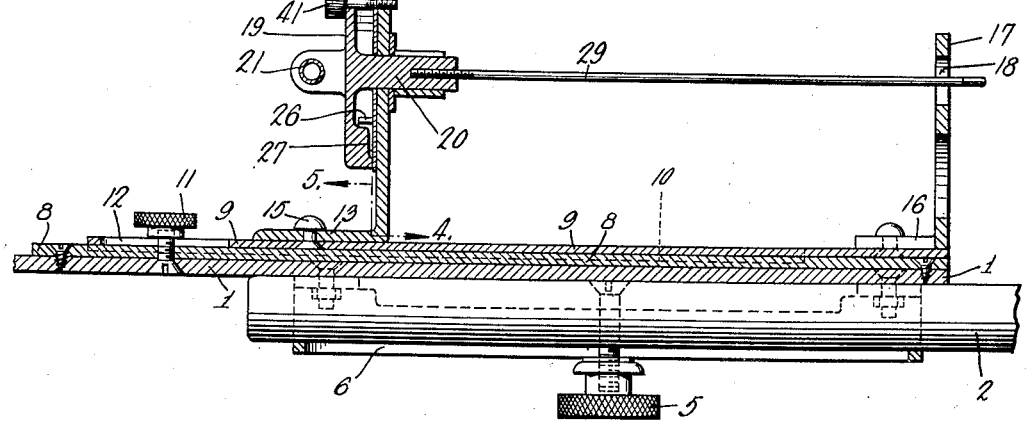
Inventor:-
David Solodar
by his Attorneys
Howson & Howson April 22, 1941.    D. SOLODAR    2,239,579
BOWING-INSTRUCTION AND PRACTICE DEVICE
Filed July 5, 1940    4 Sheets-Sheet 3
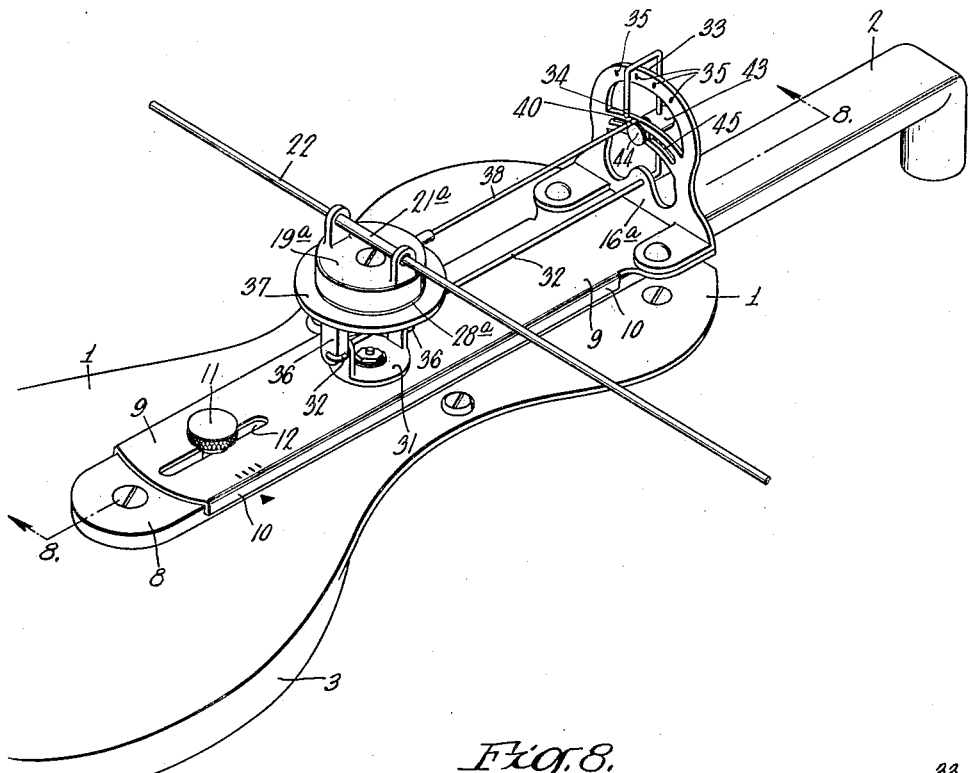
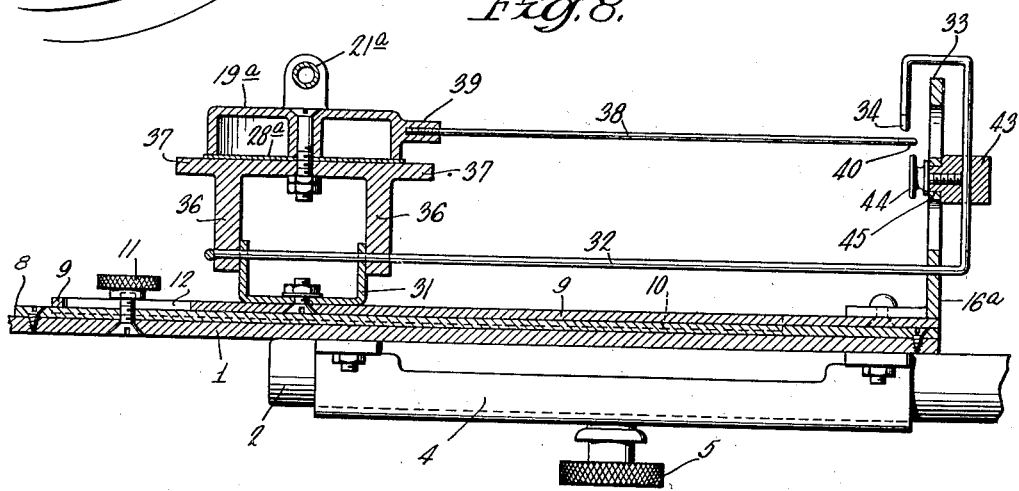

April 22, 1941.　　　D. SOLODAR　　　2,239,579
BOWING-INSTRUCTION AND PRACTICE DEVICE
Filed July 5, 1940　　　4 Sheets-Sheet 4
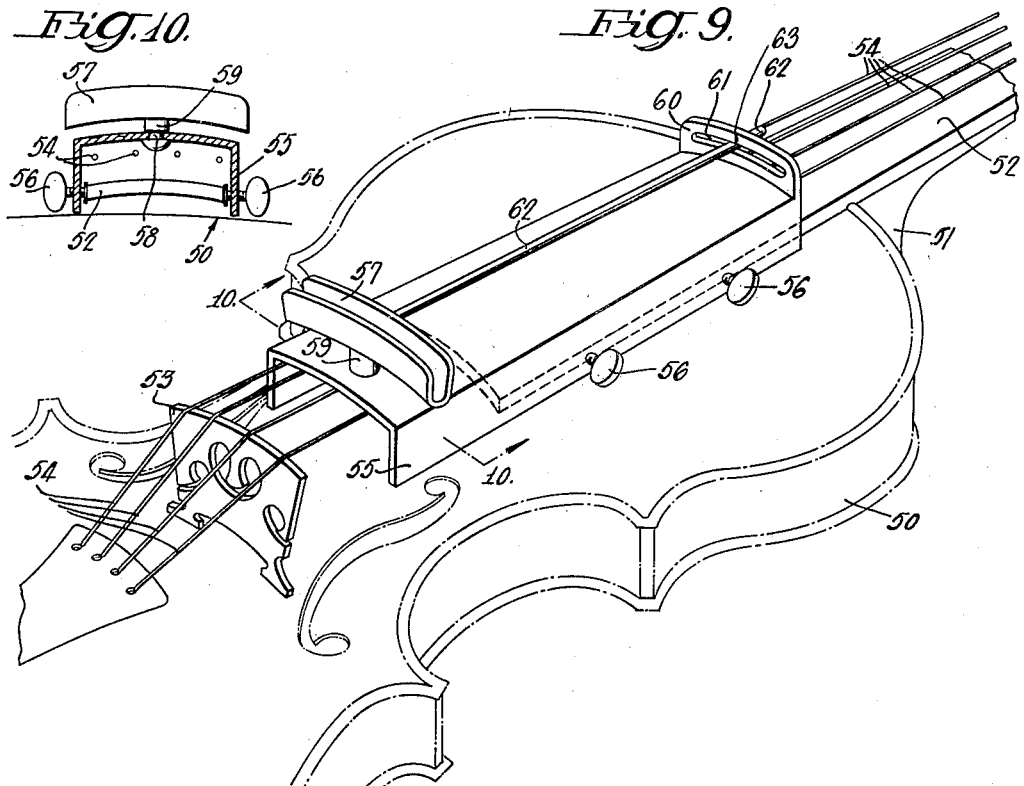
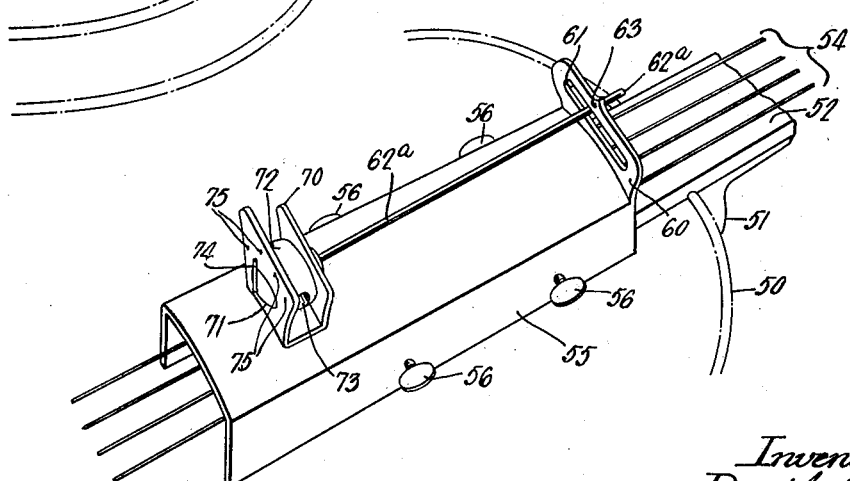
Inventor:-
David Solodar
by his Attorneys
Howson & Howson Patented Apr. 22, 1941

2,239,579

UNITED STATES PATENT OFFICE 2,239,579

BOWING INSTRUCTION AND PRACTICE DEVICE

David Solodar, Ephrata, Pa.

Application July 5, 1940, Serial No. 344,142

22 Claims. (Cl. 84—283)

This invention relates to new and useful improvements in devices or apparatus for the instruction of stringed musical instrument playing, and is a continuation-in-part of my co-pending application Serial No. 301,822, filed October 28, 1939 and allowed January 10, 1940.

It is well known that in the playing of stringed musical instruments, such as the violin, the position that the bow assumes upon the strings bears a definite relation to the tone effects produced. Consequently, the instruction of students in the playing of such instruments presents the problem of continually impressing upon the student the correct position of the bow upon the strings until such position, through repeated practice, becomes a part of or inherent in the natural reflex reactions and playing motions of the student and player.

With the foregoing in mind, the principal object of the present invention is to provide an instruction or practice device for stringed instrument playing whereby the student or player may visually observe whether or not the bow is in the correct position transversely of a particular string.

Another object of the invention is to provide a device of the character set forth wherein the student or player may himself be required to correct and control the position of the bow upon the strings through the media of visible indicating means operative and controlled by said bow.

A further object of the invention is to provide a device of the type described which is readily adaptable for use by persons of different size and age.

A still further object of the invention is to provide a device of the stated character in one or more forms which may be employed or attached directly upon the instrument and which may be attached to or removed from the instrument as desired or required.

These and other objects as well as the features and details of the construction and operation of the device of the invention are hereinafter fully set forth and claimed, and shown in the accompanying drawings, in which:

Figure 3 is an enlarged fragmentary view in section taken on line 3—3, Figure 2.

Figure 4 is a view, partially in section, taken on line 4—4, Figure 3.

Figure 5 is a view similar to Figure 4 taken on line 5—5, Figure 3.

Figure 6 is a fragmentary view in perspective from the underside of the device showing certain features of construction thereof.

Figure 7 is a view similar to Figure 2 and illustrates a modification or modified form of the invention.

Figure 8 is an enlarged fragmentary view in section taken on line 8—8, Figure 7.

Figure 9 is a partial perspective view of a violin or the like showing the essential features of the invention embodied in an attachment for application directly to a violin.

Figure 10 is a view in section taken on line 10—10, Figure 9; and

Figure 11 is a partial view in perspective illustrating another form of attachment embodying the present invention.

Figure 1:
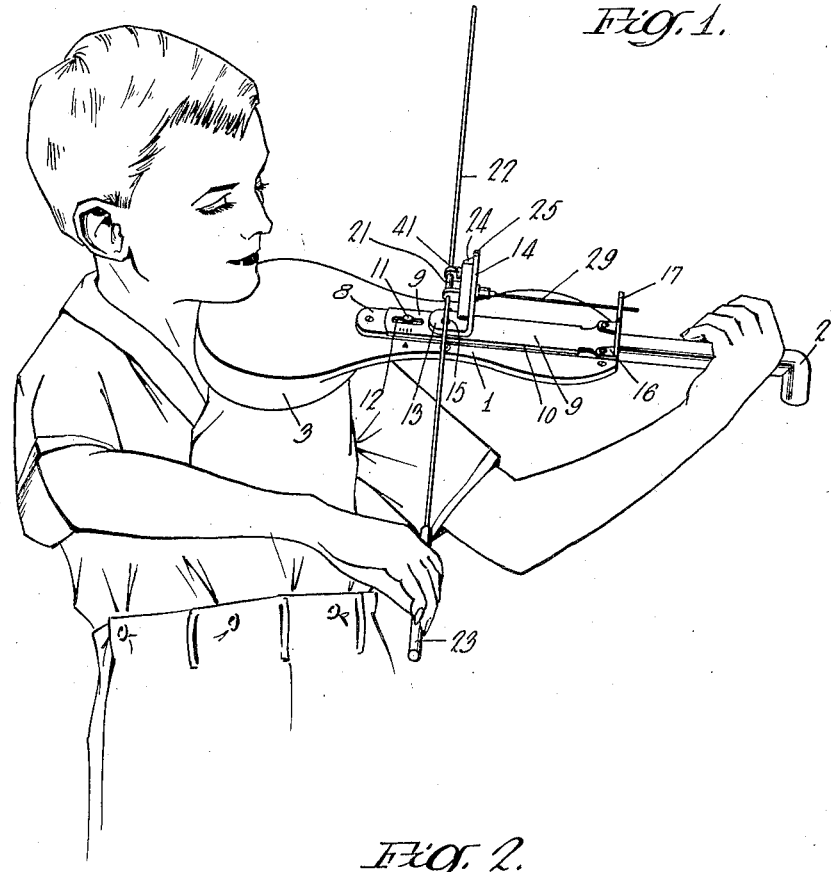
Figure 1 is a view in perspective showing the device of the present invention and the manner in which it is used by a student or player in the instruction or practice of violin bowing.

Referring now more particularly to Figures 1 to 6 inclusive of the drawings, in the form of the invention there illustrated reference numeral 1 designates the body portion of a device to the underside of the outer end of which is adjustably secured a handle 2.

The body portion 1, as will be noted, has a contour or configuration similar to that of the conventional violin, and while the body for the most part has no appreciable thickness or depth, it is thickened at its inner end as indicated at 3 to enable the user to grip the same beneath the chin in the accepted manner of a violin.

As shown more particularly in Figure 6 of the drawings, the handle member 2 is mounted for adjustable sliding movement axially of the device in a guide bracket 4 secured to the body 1 at the underside thereof, the said handle 2 being regulatable axially at will by first loosening and tightening a nut or the like 5 which is threaded on a screw carried by the handle 2 and projects through a slot 6 in the aforesaid guide bracket 4. To facilitate adjustment of the handle 2 in the above manner to various lengths or positions, markings 7 are provided thereon at suitably spaced intervals.

Mounted lengthwise axially of the body 1 upon the upper surface thereof and in alignment with the handle 2 is an elongated plate 8 which serves as a support and guide for a base or bracket 9. This base or bracket 9 is arranged for sliding adjustable movement upon the plate 8 lengthwise axially of the body 1 and the depending flanges 10 of said base 9 cooperate with said plate 8 to positively guide the base 9 in that direction. Adjustment of the base lengthwise of the plate 8 and body 1 may be effected by loosening and tightening of a lock nut or the like 11 upon a screw which passes through a slot 12 in the base 9 and is threaded in the plate 8.

Overall movement of the base 9 is limited by the length of the slot 12 and markings are provided both on said base 9 and the body 1 to aid in proper positioning of the former, the said base 9 in most instances being adjusted and positioned in relation with respect to the adjustment and positioning of the handle 2 with respect to the body 1 in accordance with the requirements of a particular user.

A bracket 13 including an upstanding portion 14 is secured upon the base 9 by means of a pivot 15 whereby the said bracket 13 is rotatable in a plane parallel to the plane of the surface of the body 1. A second bracket 16 is also secured, but in a fixed position, upon the base 9 at its outer end and is spaced from the previously mentioned bracket 13. This second bracket 16 has an upstanding portion 17 disposed in a plane transversely of the lengthwise axis of the device, and in the upper part of this portion 17 there is provided a straight horizontal slot 18 whose lengthwise axis lies in a plane parallel to the surface of the body 1.

Referring now particularly to Figures 3, 4 and 5 of the drawings, a disk or dial-like element 19 has its central hub portion 20 mounted or journalled in the upstanding portion 14 of the bracket 13, so that the axis of rotation of the disk 19 and its hub portion 20 lies parallel to the surface of the body 1 and in the same plane as the lengthwise horizontal axis of the slot 18 in the portion 17 of the previously mentioned fixed bracket 16 as shown.

Secured upon the outer side or surface of the disk 19 is a tubular guide element 21 which is intended to slidably receive a rod or the like 22 equipped with a handle 23 and representing a violin bow. This tubular guide element 21 is disposed in a generally horizontal relation with respect to the body 1, and it will be observed that said guide 21 is centered directly above the pivot 15 of the bracket 13 which is desirable.

Figure 2:
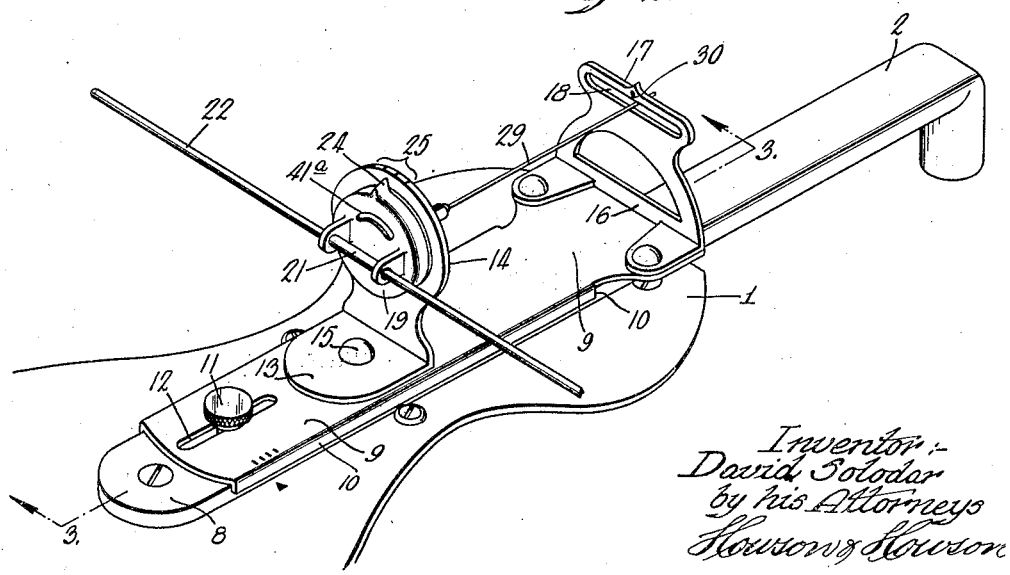
Figure 2 is an enlarged fragmentary view in perspective of the device illustrating certain features of its construction and operation.

At the top peripheral portion of the said disk 19 is provided a pointer or the like 24 adapted to register with one or another of four marks, notches or the like indicia 25 on the upper edge of the portion 14 of the bracket 13 as shown in Figure 2. These indicia 25 represent the conventional four strings of a violin and rotation of the disk 19 is limited to slightly more than the arcuate extent of said indicia 25 by means of lugs 26 formed on the portion 14 of bracket 13 between which lugs 26 moves a lug 27 forming a part of said disk 19.

To insure substantially smooth and noiseless movement of the disk 19, a washer 28 of the configuration shown in Figure 4 is interposed between said disk 19 and the portion 14 of the bracket 13, a portion of the washer extending downwardly between the lugs 26 to maintain said washer in proper fixed position.

Secured in the outer end of the hub portion 20 of the disk 19 and projecting co-axially therefrom is a rigid wire or rod 29 which has its opposite end portion projecting freely through the slot 18 of the fixed bracket 16.

From the foregoing description it will be observed that the disk 19 is rotatable about its axis in planes perpendicular to the body 1 to positions corresponding to the four strings of a violin as represented by the indicia 25, and that, by virtue of the pivotal mounting of the bracket 13, said disk may be bodily rotated in a plane parallel to said body 1, this latter causing movement of the rod 29 horizontally within the slot 18 of the bracket 16.

Since it is essential for the best tone effects that the position of the bow upon the strings of a violin be in a plane transversely of the strings, the objective is, of course, to maintain the indicator rod 29 centrally of the slot 18 as marked at 30 and shown in Figure 2 of the drawings while moving the bow-rod 22 back and forth through the tubular guide 21 as though playing a violin in the manner shown in Figure 1. The bow-rod 22 and the disk 19 may be moved as desired to positions corresponding to the different strings represented by indicia 25 and throughout any and all such movement and while changing from one string position to another the objective is to accomplish these movements while maintaining the bow-rod 22 transversely of the strings, the user of the device being able to check the extent of deviation from a true transverse bow position by observing the position of the rod 29 in the slot 18 of the bracket 16 and endeavoring at all times to maintain said rod 29 in alignment with the central marker 30 for each of the different string positions of a violin.

The ultimate in bowing technique is obtained, of course, when the user of the device or practicer is able unconsciously to maintain the rod 29 aligned with the marking 30 while actuating the bow-rod 22 through movements representative of the playing of a violin.

A modified form of the invention is shown in Figures 7 and 8 of the drawings. The device there shown is the same as that previously described except that a different arrangement and mounting of the indicating mechanisms is provided together with certain additional detail refinements.

In this modified form of the invention, a reference to Figures 7 and 8 of the drawings disclose that the bracket 13 is replaced by a U-shaped bracket 31 which is fixedly secured to the base 9 axially and longitudinally thereof. An axially extending rod 32 is journalled in the bracket 31 and also in the bracket 16a which is fixedly secured upon the outer end of the base 9, and the end portion of said rod 32 extends upwardly parallel and adjacent said bracket 16a and then passes over the upper arcuate edge 33 thereof terminating as indicated at 34 downwardly adjacent four markers, notches or like indicia 35 representing the strings of a violin and with which the portion of said rod 32 adjoining the end 34 is adapted to register.

Secured upon the rod 32 at either side of the bracket 31 are the depending legs 36 of an upper bracket 37 having a flat upper surface centrally upon which is rotatably mounted a disk 19a having a tubular bow-rod guide 21a arranged in a generally transverse relation thereon as shown, a washer 28a being interposed between said disk 19a and bracket 37 for the same purpose as the previously described washer 28.

An axially and longitudinally extending rod 38 is secured at one of its ends to the disk 19a as indicated at 39 and the other end 40 of said rod 38 terminates at the fixed bracket 16a. This rod 38 is the counterpart of the rod 29 of the device shown in Figures 1 to 6 previously described.

From the foregoing it will be seen that in this form of the invention the disk 19a, bracket 37 and the rod 32 may be rocked transversely to place the portion adjoining the end 34 of said rod in register with any one of the indicia 35 corresponding to the different string positions of the violin while the disk 19a is rotatable upon the bracket 37 to give the student or practicer a visible indication of an incorrect bow position and allow him or her to endeavor to attain a correct transverse bow position by maintaining the outer end 40 of the rod 38 in alignment with the end 34 of rod 32 as hereinbefore described.

In certain instances it may be found advantageous to secure the device in a position corresponding to one or another of the four strings of a violin as represented by the indicia and for this purpose there is provided in the disk 19 of the first form of device suitably located slot 41a adapted to receive a screw 41 for engagement with a threaded opening 42 in the bracket 13 and washer 28, while in the modified form of the invention shown in Figures 7 and 8 of the drawings, a block 43 is carried by the rod 32 and this block 43 may be slidably adjustably secured by a lock screw 44 in a slot 45 provided in the fixed bracket 16a as shown.

Instead of the practice devices or instruments previously described, the essential features of the invention may be embodied also in devices arranged for attachment directly to a violin or other stringed instrument, for example, as shown in Figures 9 to 11 of the drawings, and referring now particularly to Figure 9, numeral 50 designates a violin having the usual neck-piece 51, finger board 52, bridge piece 53 and the several strings 54 which extend over said bridge piece and longitudinally along and above the finger board 52 in the conventional manner.

In the form of the invention illustrated in Figure 9 the device comprises a supporting or base structure 55 of inverted channel cross-section shape adapted, as shown, to be positioned over both the finger board 52 and the several strings 54 of the instrument, said structure 55 being clamped to said finger board 52 by means of thumb screws or the like 56 which may be tightened inwardly against the opposite sides of the finger board 52 (see Figure 10).

A guide 57 of channel-like shape for slidably receiving the bow element is pivotally mounted upon the upper face of the structure 55 adjacent the inner end thereof as a pin or the like 58 and this guide 57 has a collar or sleeve portion 59 at its underside so that said guide 57 is spaced somewhat above the said structure 55 (see Figure 10). It will be seen also that the guide channel 57 is upwardly arched or convexed and conforms generally to the transverse curvature or contour of the strings 54 whereby the bow element may be moved through the guide in the various angular positions customary when playing the different strings of such an instrument. Also, the structure 55 is secured longitudinally of the finger board 52 so that the guide channel 57 is properly positioned in the usual bowing region or zone intermediate the bridge 53 and the finger board 52.

At or adjacent the other or outer end of the structure 55 is an upstanding bracket or portion 60 disposed in a vertical place transverse the strings 54 and in this bracket or member or portion 60 there is provided a horizontal opening or slot 61. Secured to the outer face of the guide channel 57 and movable therewith is a rigid wire or rod 62 which extends substantially parallel to the strings 54 and has its opposite end portion projecting freely through the said slot 61 in the bracket or portion 60 just described.

Another form of such an attachment for stringed instruments is shown in Figure 11 of the drawings and the device there shown is substantially the same as that shown in Figures 9 and 10 except that a different arrangement and mounting of the bow element guide member is provided together with certain additional detail refinements.

In this modified form of the attachment it will be seen that the guide channel 57 and its pivotal support structure is replaced by a U-shaped bracket 70, the two legs of which have circular openings 71 cut therein, and in these openings and between said legs there is universally mounted a spherical bow guide or holder 72 having a bow-receiving opening 73 extending diametrically therethrough.

In this particular form of the invention the bow guide or holder 72 has secured thereto a pointer 74 which is movable therewith and arranged to register with indicia or markings 75 representative of the positions of the several strings of the violin. Also, and as in the case of the devices hereinbefore described, a rod or like element 62a is secured to and movable with the guide 72 and this rod 62a extends parallel to the strings 54 of the instrument and has its other or outer end projecting freely through slot 61 in the bracket or portion 60 of the device.

From the foregoing it will be seen that in the devices shown in both Figures 9 and 11 the bow element may be moved to positions corresponding to the strings of a violin or like instrument and that by virtue of the pivotal mounting of the bow guides may be bodily rotatable in a plane parallel to the body of the violin thereby causing movement of the rods 62, 62a within the slot 61 of bracket 60, the objective, of course, being to maintain said rods in alignment with the central markers 63 at all times during back and forth movement of the bow element within the bow guides for all string positions as hereinbefore described.

The present invention provides an instruction and practice device for violin playing wherein the bowing movements for the most part are not fixedly guided and the student or practicer is required to correct his or her own faulty movements thus creating more interest in the task and more thorough, rapid mastery of the technique of bowing.

While two forms of the invention have been illustrated and described herein it will be obvious that certain changes and modifications in the construction and arrangement thereof may be made, and such changes and modifications are intended to be a part of this invention where within the scope of the appended claims.

I claim:

1. A device of the character described for instruction in the art of playing stringed instruments by bowing the strings comprising a base member, a holder for slidably receiving an element representing a bow, said holder being pivotally mounted with respect to said base member for rotation in a plane substantially parallel thereto by movement of said bow, and means movable with the holder for registration with indicia designating the correct bow position for all of the several strings of the instrument.

2. A device of the character described for instruction in the art of playing stringed instruments by bowing the strings comprising a base member, a holder for slidably receiving an element representing a bow, said holder being pivotally mounted with respect to said base member for rotation in a plane substantially parallel thereto by movement of said bow, a bracket portion spaced from the holder, and means carried by and movable with said holder for registration with indicia in said bracket portion designating the correct bow position for all of the several strings of the instrument.

3. A device of the character described for instruction in the art of playing stringed instruments by bowing the strings comprising a base member, a holder for slidably receiving an element representing a bow, said holder being pivotally mounted with respect to said base member for rotation in planes substantially vertical and parallel thereto by movement of said bow, and means movable with the holder for registration with indicia designating the correct bow position for all of the several strings of the instrument.

4. A device of the character described for instruction in the art of playing stringed instruments by bowing the strings comprising a base member, a holder for slidably receiving an element representing a bow, said holder being pivotally mounted with respect to said base member for rotation in planes substantially vertical and parallel thereto by movement of said bow, means movable with said holder for registration with indicia designating the positions of the several strings of the instrument, and other means also movable with the holder for registration with indicia designating the correct bow position for all of the several strings of the instrument.

5. A device of the character described for instruction in the art of playing stringed instruments played by bowing the strings including a body structure; a holder for slidably receiving an element representing a bow; and a supporting structure for said holder comprising means rotatable in at least one plane perpendicular to the body structure by movement of said bow element in the holder, said means having an indicator movable therewith arranged for register with indicia designating the several strings of the instrument, and other means also rotatable by movement of said bow element about an axis perpendicular to the axis of rotation of the first means and having an indicator movable therewith for registration with indicia designating the correct bow position for all of the several positions representative of the several strings of the instrument to which said first means may be actuated.

6. A device of the character described for instruction in the art of playing stringed instruments played by bowing the strings including a body structure; a holder for slidably receiving an element representing a bow; and a supporting structure for said holder comprising means rotatable in at least one plane perpendicular to the body structure by movement of said bow element in the holder, said means having an indicator movable therewith arranged for register with indicia designating the several strings of the instrument, other means also rotatable by movement of said bow element about an axis perpendicular to the axis of rotation of the first means and having an indicator movable therewith for registration with indicia designating the correct bow position for all of the several positions representative of the several strings of the instrument to which said first means may be actuated; and means for securing the first rotatable means in any one of the positions representative of the strings of the instrument.

7. A device of the character described for instruction in the art of playing stringed instruments played by bowing the strings including a body structure; a holder for slidably receiving an element representing a bow; and a supporting structure for said holder comprising means rotatable in at least one plane perpendicular to the body structure by movement of said bow element in the holder, said means having an indicator movable therewith arranged for register with indicia designating the several strings of the instrument, and other means also rotatable by movement of said bow element about an axis perpendicular to the axis of rotation of the first means; a bracket secured to said body structure and spaced from the holder supporting structure; and an element connected to said other rotatable means and movable therewith for registration with indicia on said bracket designating the correct bow position for all of the several positions of the strings of the instrument to which the first means may be actuated.

8. A device of the character described for instruction in the art of playing stringed instruments played by bowing the strings including a body structure; a holder for slidably receiving an element representing a bow; and a supporting structure for said holder comprising means rotatable in at least one plane perpendicular to the body structure by movement of said bow element in the holder, said means having an indicator movable therewith arranged for register with indicia designating the several strings of the instrument, and other means also rotatable by movement of said bow element about an axis perpendicular to the axis of rotation of the first means, a bracket secured to said body structure and spaced from the holder supporting structure; an element connected to said other rotatable means and movable therewith for registration with indicia on said bracket designating the correct bow position for all of the several positions of the strings of the instrument to which the first means may be actuated; and means for securing the first rotatable means in any one of the positions representative of the strings of the instrument.

9. A device of the character described for instruction in the art of playing stringed instruments played by bowing the strings including a body structure; a holder for slidably receiving an element representing a bow; and a supporting structure for said holder comprising a disk rotatable in at least one plane perpendicular to the body structure by movement of said bow element in the holder, said disk having an indicator movable therewith arranged for register with indicia designating the several strings of the instrument, and a bracket also rotatable by movement of said bow element about an axis perpendicular to the axis of rotation of the disk and having an indicator movable therewith for registration with indicia designating the correct bow position for all of the several positions representative of the several strings of the instrument to which said disk may be actuated.

10. A device of the character described for instruction in the art of playing stringed instruments played by bowing the strings including a body structure; a holder for slidably receiving an element representing a bow; and a supporting structure for said holder comprising a disk rotatable in at least one plane perpendicular to the body structure by movement of said bow element in the holder, said disk having an indicator movable therewith arranged for register with indicia designating the several strings of the instrument, a bracket also rotatable by movement of said bow element about an axis perpendicular to the axis of rotation of the disk and having an indicator movable therewith for registration with indicia designating the correct bow position for all of the several positions representative of the several strings of the instrument to which said disk may be actuated; and means for securing the disk in any one of the positions representative of the strings of the instrument.

11. A device of the character described for instruction in the art of playing stringed instruments played by bowing the strings including a body structure; a holder for slidably receiving an element representing a bow; and a supporting structure for said holder comprising a disk rotatable in at least one plane perpendicular to the body structure by movement of said bow element in the holder, said disk having an indicator movable therewith arranged for register with indicia designating the several strings of the instrument, and a first bracket also rotatable by movement of said bow element about an axis perpendicular to the axis of rotation of the disk; a second bracket secured to said body structure and spaced from the first bracket; and an element connected to said disk and movable therewith and with said first bracket for registration with indicia on said second bracket designating the correct bow position for all of the several string positions to which the disk may be rotated.

12. A device of the character described for instruction in the art of playing stringed instruments played by bowing the strings including a body structure; a holder for slidably receiving an element representing a bow; and a supporting structure for said holder comprising a disk rotatable in at least one plane perpendicular to the body structure by movement of said bow element in the holder, said disk having an indicator movable therewith arranged for register with indicia designating the several strings of the instrument, a first bracket also rotatable by movement of said bow element about an axis perpendicular to the axis of rotation of the disk; a second bracket secured to said body structure and spaced from the first bracket; an element connected to said disk and movable therewith and with said first bracket for registration with indicia on said second bracket designating the correct bow position for all of the several string positions to which the disk may be rotated; and means for securing the disk in any one of the positions representative of the strings of the instrument.

13. A device of the character described for instruction in the art of playing stringed instruments played by bowing the strings including a body structure; a holder for slidably receiving an element representing a bow; and a supporting structure for said holder comprising a bracket rotatable in at least one plane perpendicular to the body structure by movement of said bow element in the holder, said bracket having an indicator movable therewith arranged for register with indicia designating the several strings of the instrument, and a disk also rotatable by movement of said bow element about an axis perpendicular to the axis of rotation of the bracket and having an indicator movable therewith for registration with indicia designating the correct bow position for all of the several positions representative of the several strings of the instrument to which said bracket may be actuated.

14. A device of the character described for instruction in the art of playing stringed instruments played by bowing the strings including a body structure; a holder for slidably receiving an element representing a bow; and a supporting structure for said holder comprising a bracket rotatable in at least one plane perpendicular to the body structure by movement of said bow element in the holder, said bracket having an indicator movable therewith arranged for register with indicia designating the several strings of the instrument, and a disk also rotatable by movement of said bow element about an axis perpendicular to the axis of rotation of the bracket and having an indicator movable therewith for registration with indicia designating the correct bow position for all of the several positions representative of the several strings of the instrument to which said bracket may be actuated; and means for securing the bracket in any one of the designated positions of the strings of the instrument.

15. A device of the character described for instruction in the art of playing stringed instruments played by bowing the strings including a body structure; a holder for slidably receiving an element representing a bow; and a supporting structure for said holder comprising a first member rotatable in at least one plane perpendicular to the body structure by movement of said bow element in the holder, said member having an indicator movable therewith arranged for register with indicia designating the several strings of the instrument, and a second member also rotatable by movement of said bow element about an axis perpendicular to the axis of rotation of the first member; a bracket secured to said body structure and spaced from the first and second members; and an element connected to said second member and movable therewith for registration with indicia on said bracket designating the correct bow position for the several string positions to which the bracket may be actuated.

16. A device of the character described for instruction in the art of playing stringed instruments played by bowing the strings including a body structure; a holder for slidably receiving an element representing a bow; and a supporting structure for said holder comprising a first member rotatable in at least one plane perpendicular to the body structure by movement of said bow element in the holder, said member having an indicator movable therewith arranged for register with indicia designating the several strings of the instrument, and a second member also rotatable by movement of said bow element about an axis perpendicular to the axis of rotation of the first member; a bracket secured to said body structure and spaced from the first and second members; an element connected to said second member and movable therewith for registration with indicia on said bracket designating the correct bow position for the several string positions to which the bracket may be actuated; and means for securing the first bracket in any one of the designated positions of the strings of the instrument.

17. A device of the character described for instruction in the art of playing stringed instruments by bowing the strings comprising a base member arranged for mounting upon the finger board of an instrument, means for securing said base member to said finger board, a holder for slidably receiving an element representing a bow, said holder being pivotally mounted with respect to the base member for rotation substantially parallel thereto by movement of said bow element, and means carried by and movable with the holder for registration with indicia designating the correct bow position for all of the several strings of the instrument.

18. A device of the character described for instruction in the art of playing stringed instruments by bowing the strings comprising a base member arranged for mounting upon the finger board of an instrument, means for securing said base member to said finger board, a holder for slidably receiving an element representing a bow, said holder being pivotally mounted with respect to the base member for rotation substantially parallel thereto by movement of said bow element, a bracket portion spaced from the holder, and means carried by and movable with said holder for registration with indicia on said bracket portion designating the correct bow position for all of the several strings of the instrument.

19. A device of the character described for instruction in the art of playing stringed instruments by bowing the strings comprising a base member arranged for mounting upon the finger board of an instrument, means for securing said base member to said finger board, a bracket, a holder mounted for substantially universal movement in said bracket and arranged to slidably receive an element representing a bow, said holder being actuable by movement of said bow element, and means movable with the holder for registration with indicia designating the correct bow position for all of the several strings of the instrument.

20. A device of the character described for instruction in the art of playing stringed instruments by bowing the strings comprising a base member arranged for mounting upon the finger board of an instrument, means for securing said base member to said finger board, a bracket, a holder mounted for substantially universal movement in said bracket and arranged to slidably receive an element representing a bow, said holder being actuable by movement of said bow element, a bracket portion spaced from the holder, and means carried by and movable with said holder for registration with indicia on said bracket portion designating the correct bow position for all of the several strings of the instrument.

21. A device of the character described for instruction in the art of playing stringed instruments by bowing the strings comprising a base member arranged for mounting upon the finger board of an instrument, means for securing said base member to said finger board, a bracket, a holder mounted for substantially universal movement in said bracket and arranged to slidably receive an element representing a bow, said holder being actuable by movement of said bow element, means movable with said holder for registration with indicia designating the positions of the several strings of the instrument, and means movable with the holder for registration with indicia designating the correct bow position for all of the several strings of the instrument.

22. A device of the character described for instruction in the art of playing stringed instruments by bowing the strings comprising a base member arranged for mounting upon the finger board of an instrument, means for securing said base member to said finger board, a bracket, a holder mounted for substantially universal movement in said bracket and arranged to slidably receive an element representing a bow, said holder being actuable by movement of said bow element, means movable with said holder for registration with indicia designating the positions of the several strings of the instrument, a bracket portion spaced from the holder, and means carried by and movable with said holder for registration with indicia on said bracket portion designating the correct bow position for all of the several strings of the instrument.

DAVID SOLODAR.